Sept. 22, 1936.  E. LEITZ, JR  2,055,237
PROJECTION AND REPRODUCTION SYSTEM
Filed Feb. 15, 1933  2 Sheets-Sheet 1
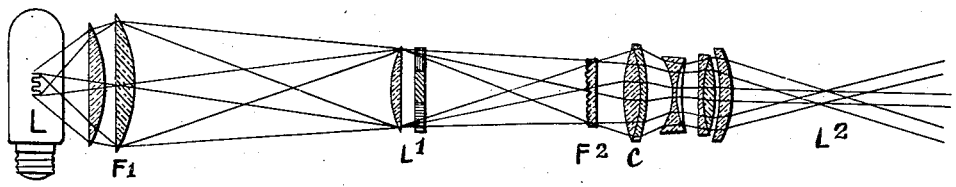
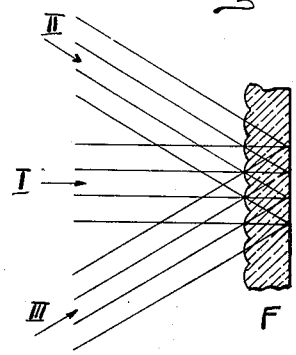
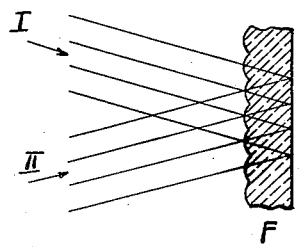
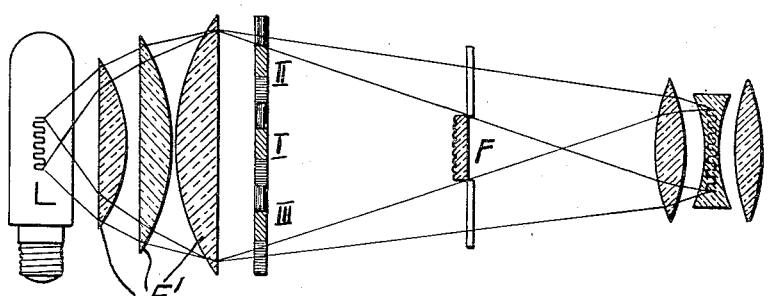
INVENTOR
Ernst Leitz, jr.
BY
ATTORNEY Sept. 22, 1936.    E. LEITZ, JR    2,055,237
PROJECTION AND REPRODUCTION SYSTEM
Filed Feb. 15, 1933    2 Sheets-Sheet 2
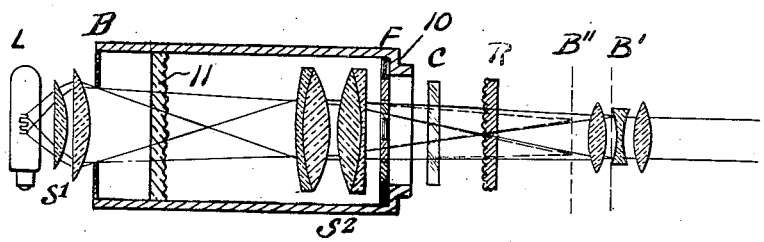
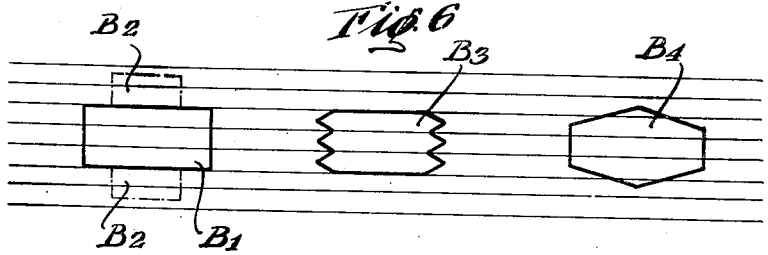
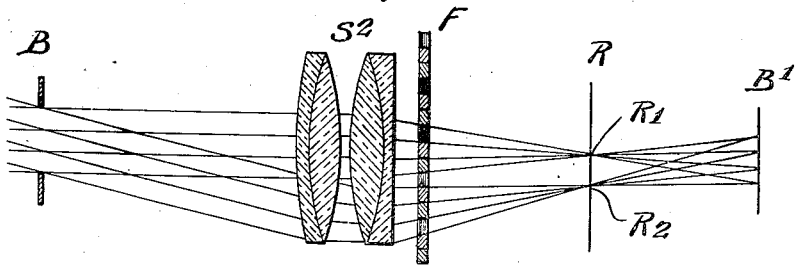
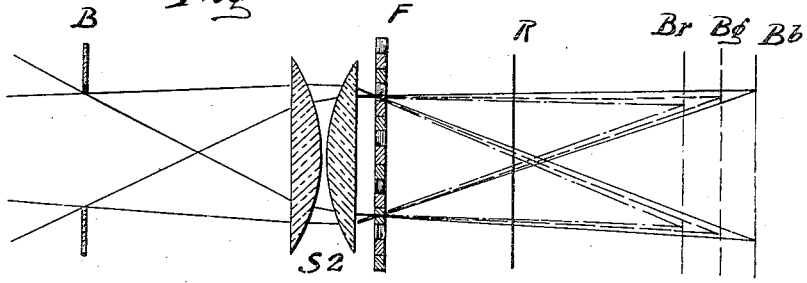

Patented Sept. 22, 1936

2,055,237

UNITED STATES PATENT OFFICE 2,055,237

PROJECTION AND REPRODUCTION SYSTEM

Ernst Leitz, Jr., Wetzlar, Germany, assignor to Ernst Leitz, Optische Werke, G. m. b. H., Wetzlar, Germany Application February 15, 1933, Serial No. 656,822

2 Claims. (Cl. 88—16.4)

This invention relates to improvements in the projection or reproducing systems for color films according to the Berthon system in which the filter is usually arranged in front of or within the objective, and it is the object of my invention to arrange the filter between the source of light and the film.

With such an arrangement the film is illuminated by rays which have already passed the filter and is thus considerably less heated than with the usual arrangements, thus permitting the use of lamps of greater candle power.

In the practical embodiment of my invention I achieve this result either by making use of all the light rays of a source of illumination or by using very simple mechanical means to produce the desired result.

In both instances the film lenticulations are directed towards the source of light so that an inverted picture is obtained which by means of a mirror is righted again. The picture appearing on the screen will be found to be composed of narrow colored stripes in contradistinction to the known projections in which one width of the lens screen appears uniformly colored. The pupil of the projection objective is not divided into tri-colored stripes as heretofore but is uniformly illuminated. This arrangement makes the system particularly well adapted for the reproduction of colored films because another color filter or screen may now be arranged in the pupil of the objective for the reproduction of the picture upon another lenticular film. During projection this arrangement has the advantage that projection objectives of any focal distance may be employed.

If however, the reflecting surfaces of the sources of light have not always an ideal, perfectly homogeneous surface brightness, the light-ray bunches striking a certain spot of the picture from different directions have varying degrees of brightness as they come from different points from a light source or of the intermediary pupil.

Therefore, according to my invention the source of light or an intermediary pupil are so arranged that while they allow the unequal distribution of the light in the plane of the picture field yet avoid the presence of color of dominant character of equal size, or in other words allow the reproduction of the source of light or of an intermediary pupil in the plane of the picture field. It is expedient with such arrangements to provide a wavy or corrugated glass face within the path of the rays of the source of light. However also the aforedescribed arrangement has still the disadvantage that for the perfect illumination of the filter, film picture and objective a source of light of a comparatively great candle power must be employed.

The same degree of brightness can be obtained by making an enlarged picture with a source of light of comparatively small candle power by means of a strong light condenser of short focal length and by means of a second condenser of long focal length.

In order to avoid the presence of colors of dominant character with such an arrangement a shutter is pictured by means of the second condenser in approximately the main point plane of the objective. This shutter may have a shape allowing its displacement vertically to the filter stripes without altering the proportion of the colored areas cut from the filter. The second condenser may be utilized for the purpose of obtaining correct color values, to produce in the vicinity of the front principal plane of the objective an image of a diaphragm which is so shaped that whatever position in its own plane it may occupy, it will uncover equal portions of the colors in the filter.

Furthermore, it is necessary to avoid the appearance of color defects caused by the utilization of the second condenser. This I achieve by making the condenser highly achromatic, even apochromatic or by selecting the width of the filter stripes proportionate to the enlargements of the three colored pictures of the shutter based on the physiological point of gravity. With such an arrangement it will also be possible to adapt the system to the different projection objectives.

The picture area of the shutter may either be changed by the interpolation of a cylinder lens between the filter and the film having its axis at right angles to the direction of the filter stripes corresponding to the main point plane of the objective, or the shutter or diaphragm may be adjusted in size to correspond to the optical constants of the film and the aperture of the objective.

These and other objects and advantages of my invention will become more fully known as the description thereof proceeds and will then be more specifically defined in the appended claims.

In the accompanying drawings forming a material part of this disclosure:

Fig. 1 illustrates diagrammatically a film projection or reproduction system constructed according to my invention.

Fig. 2 shows the center part of a lenticular film illustrating the reproduction of the colors.

Fig. 3 is a view similar to Figure 2 of the lower part thereof.

Fig. 4 illustrates the use of normal projection objectives with my system.

Fig. 5 is a sectional elevation of the entire system.

Fig. 6 shows various forms of shutters or diaphragms used with my system.

Fig. 7 illustrates the reproduction of the shutter or diaphragm by means of an achromatic condenser.

Fig. 8 illustrates the reproduction of the shutter or diaphragm by means of a chromatic uncorrected condenser.

As illustrated in Figures 1 and 4, the full value of the stream of light of the lamp L is received by a collector F' is reproduced in $L^2$ by means of an intermediary member L' and by the collective-member C in the projection objective; the lens L' reproducing the plane F' in $F^2$. In Figure 4 an arrangement is shown, permitting the use of normal projection objectives. I, II and III in Figures 2 and 4 represent each a manifold filter as used in the making of the film. F designates the lenticular film, the lenses of which are directed towards the source of light. A condenser of comparatively large diameter must here be used as other filters are arranged parallel to the normal filter stripes. The width of the filters is so selected that the same color is reproduced on the same place by means of the neighbor lenses of the film.

The film F is mounted with its lenticulations facing the source of light L. The filter comprises a series of parallel color stripes mounted in the same plane one above the other, with the colors arranged in a periodically repeating sequence. Thus in the example illustrated there are three groups II, I, III of stripes each group having three colors (for example red, green, and blue) arranged in the same order as in the other groups, so that each group is similar to the multi-color filter commonly used in the camera for photographing the film. The elements of the condenser F' are of such a size as to ensure complete illumination of the filter stripes, the film and the objective.

The widths of the individual strips of the filter and the intervening spaces between them, if they are not arranged in contact with one another, are chosen to suit the optical constants of the film, so that filter strips of the same color are reproduced by the adjoining lenticulations of the film on the same strip of the image-bearing layer of the film.

This is diagrammatically illustrated in Figures 2 and 3. Thus Figure 2 shows the rays approaching the central portion of the photographic image, the rays from the filter groups II, I, III, being respectively indicated at F. The rays from the central filter group I lying on the optical axis follow paths exactly corresponding to those followed by the similarly colored rays when the film was exposed through a color filter in the camera, and it will be clear that for instance all the red rays approaching this portion of the film will be incident on that point of the image-bearing layer on which the red rays were incident during exposure in the camera.

Figure 3 similarly shows the rays approaching the lower edge of the photographic image where of course the light is mainly received from the lower two filter groups I, III, the corresponding ray groups being indicated at I, II respectively.

If the film has fine lenticulations and is of relatively great thickness the number of filter strips can be increased.

The filter carrier is preferably adjustable in position along the optical axis and its position is so chosen (in a manner analogous to that known in other color picture photographic- and projection-arrangements) in relation to widths of the filter strips as to suit the position and size of the virtual image of the filter used in the camera in which the film was exposed.

The foregoing arrangement requires the use of a source of light giving uniform intensity over its whole surface, if exact reproduction of the correct color values is to be obtained. For, with a source having an uneven distribution of intensity the rays of light approaching a given position on the photographic image from different directions will have different intensities, since they emanate from different points of the source, with the result that certain colors will be unduly accentuated in some parts of the projected picture and other colors in other parts.

To avoid this, the condensing system of lenses is preferably so arranged as to produce an image of the source of light or of an intermediate pupil in the plane of the film and will thus give different intensity of light in different parts of the projected picture in accordance with the variations in intensity over the surface of the source of light and it will ensure substantially true color reproduction since the rays approaching any given position on the photographic image will all have substantially the same intensity and the color values at each position will be in the correct proportions relatively to one another. It is therefore preferable in this case to provide a corrugated glass 11 or like surface in the path of the rays between the source of light and the film in order to spread the light laterally.

This arrangement by itself would necessitate the use of a large source of light to give complete illumination over the whole field, but the same effect can also be obtained by magnifying a smaller source of light by means of a wide aperture condenser of short focal length in combination with a second condenser of long focal length, as illustrated in Figures 5 to 8 which will now be described.

As shown in Figures 5 to 8 an image of the source of light L is reproduced by means of a condenser S1 of short focal distance and of a condenser S2 of long focal distance in the plane of the film R and a shutter B is reproduced through the condenser S2 at B'.

Between the two condensers S1 and S2 is mounted an adjustable diaphragm B and the condenser S2 acts to produce an image of this diaphragm at B1 in the vicinity of the front principal plane of the objective. The multicolor filter F is arranged in the manner above described with reference to Figures 1 to 4.

This arrangement can readily be modified to suit the use of a different objective. In the first place, by interposing between the filter and the objective a cylinder lens indicated at C, having its axis at right angles to the direction of the filter strips, the image plane of the diaphragm can then be moved from B' to B'' to suit the principal plane of the new objective. Furthermore, the diaphragm B can be adjusted in size in accordance with the aperture of the objective and the optical constants of the film, in order to ensure the cutting off of equal amounts of the individual colors and to prevent the formation of color dominants.

The diaphragm is given such a shape that after its size has been correctly adjusted it will cut off equal amounts of the individual colors whatever position in its own plane it may occupy. This condition is met by a variety of diaphragm shapes such for example as those illustrated in Figure 6, wherein the horizontal lines divide the area into bands corresponding to the individual color strips of the filter.

Figure 6 shows at B2 a rectangularly shaped diaphragm and at B3 a diaphragm of irregular shape, while B4 is a diaphragm of hexagonal shape all having appropriate dimensions. It will be clear that many other shapes or combinations of shapes may be used to meet the above mentioned conditions.

The initial adjustment of the diaphragm size to suppress color dominants is effected in a direction perpendicular to the direction of the filter strips. The method of adjustment is indicated at 10 in Figure 5, and is generally analogous to that employed in the well known iris diaphragm. Thus, with the diaphragm shapes of Figure 6 the upper and lower edges of the diaphragm opening may be formed by the edges of shutters which can move vertically towards or away from one another to effect the desired adjustment, the side edges of the opening remaining fixed. It is also important to safeguard against faulty color reproduction arising as result of chromatic aberrations in the condenser S2, this can be effected by making the condensers as far as possible achromatic even apochromatic.

If however, as shown in Figure 8 a system S2 is used which is chromatically uncorrected, the reproduction of the shutter B is effected in different planes Br, Bg, Bb corresponding to the chromatic enlargement and longitudinal deviation of the system S2.

In such a case the appearance of colors of dominant character is avoided by selecting the width of the filter stripes in filter F proportionate to the chromatic enlargements of the system S2, and a chromatic correction of the system S2 is not required.

It will be understood that I have described and shown the preferred forms of my invention only as some examples of the many possible ways to practically construct the same and that I may make such changes in the general arrangements of the system and the construction of the minor details thereof as come within the scope of the appended claims without departure from the spirit of my invention and the principles involved.

Having thus described my invention, what I claim as new and desire to secure by Letters Patent is:

1. In a projecting and projection-printing system for lenticular color-record films an incandescent lamp constituting the source of light, and a corrugated glass surface in the path of the rays between said source of light and the film to spread the light laterally, a wide aperture condenser of short focal length, and a condenser of long focal length in said system, a diaphragm between both condensers adjustable in size in accordance with the optical constant of the film and means to produce an image of said diaphragm in the vicinity of the front principal plane of the objective, said diaphragm so shaped as to uncover equal portions of the various colors in the filter in whatever position it occupies in its own plane.

2. In a projecting and projection-printing system for lenticular color-record films a source of light, said film mounted to face with its lenticulations said source of light, and a multicolor filter comprising a number of parallel color strips in which the colors are arranged in a periodically recurring order, mounted between said source of light and the film, a diaphragm so shaped that whatever position in its own plane it may occupy, it will uncover equal portions of the various colors in the filter and an achromatic objective system for producing an image of the diaphragm, means to adjust the diaphragm image to suit the use of a different objective by interposing between the filter and the film, said means comprising a cylinder lens having its axis at right angles to the direction of the filter strips, the effective widths of the individual filter strips being adjusted approximately in proportion to the magnification produced by said optical system in the diaphragm image for the corresponding colors.

ERNST LEITZ, Jr.